United States Patent Office 3,454,669
Patented July 8, 1969

---

3,454,669
NOVEL EPOXY CURING AGENTS
Michael A. Laudise, Mentor, Ohio, assignor to The Lubrizol Corporation, Wickliffe, Ohio, a corporation of Ohio
No Drawing. Continuation-in-part of application Ser. No. 586,357, Oct. 13, 1966. This application Aug. 7, 1967, Ser. No. 658,664
Int. Cl. C08g *30/14, 45/12*
U.S. Cl. 260—830                    10 Claims

ABSTRACT OF THE DISCLOSURE

N-3-oxohydrocarbon-substituted acrylamides, preferably diacetone acrylamide, react with active hydrogen compounds through the carbonyl group or the olefinic bond. The products, especially those prepared from polyamines and amine-terminated polyamides, are excellent curing agents for epoxy resins. They have low toxicity and skin and eye irritation, and resins cured therewith are stable to light and ultraviolet radiation.

---

This application is a continuation-in-part of copending application Ser. No. 586,357 filed Oct. 13, 1966, now abandoned.

This invention relates to new compositions of matter and methods for their preparation. More particularly, it relates to compositions of matter characterized by the presence therein of at least one addition or substitution product of an N-3-oxohydrocarbon-substituted acrylamide, said addition and substitution products having the general formulas $$Y^3-X-(R^n-X)_n-CH_2CH-\underset{\underset{R^6}{|}}{C}-N-\underset{\underset{R^5}{|}}{\overset{\overset{R^4}{|}}{C}}-\underset{\underset{R^2}{|}}{\overset{\overset{R^2}{|}}{C}}-Y^1$$

and $$Y^2-\overset{\overset{O}{\|}}{C}-N-\underset{\underset{H}{|}}{\overset{\overset{R^4}{|}}{C}}-\underset{\underset{R^3}{|}}{\overset{\overset{R^2}{|}}{C}}-Z-R^1$$
$$(R^n-X)_nY^2$$

wherein:

each of $R^1$, $R^2$, $R^3$, $R^4$ and $R^5$ is hydrogen or a hydrocarbon radical;
$R^6$ is hydrogen or a lower alkyl radical;
each $R^n$ is individually a divalent radical which is non-reactive with carbonyl, amide, olefinic, active-hydrogen-containing and epoxy groups;
X is a bridging atom or radical derived from an active hydrogen compound $H_2X$;

$Y^1$ is $-\overset{\overset{O}{\|}}{C}-R^1$ or $-Z-(R^n-X)_nY^3$;

$Y^2$ is $-\underset{\underset{R^6}{|}}{C}=CH_2$ or $-\underset{\underset{R^6}{|}}{C}HCH_2(X-R^n)_nX-Y^3$ $Y^3$ is hydrogen, or forms with $Y^1$ or $Y^2$ a cyclic or polymeric structure;

Z is $\diagdown CHX-$, $\diagdown \overset{\overset{XH}{|}}{\underset{\diagup}{C}}\diagdown$ or $\diagdown C=X'-$;

$X'$ is a trivalent radical formed by abstracting a hydrogen atom from X; and
$n$ is an integer from 0 to about 100.

In the above formulas, $R^1$, $R^2$, $R^3$, $R^4$ and $R^5$ may be hydrogen atoms or hydrocarbon radicals. The hydrocarbon radicals may be aliphatic, cycloaliphatic or aromatic, and the term "hydrocarbon" is intended to include radicals containing substituents exemplified by ether, ester, nitro, halogen and the like so long as such substituents are not present in amounts sufficiently large to alter substantially the hydrocarbon character of the radical. The upper limit of the proportion of such substituents in the radical is about 70% by weight.

$R^6$ is preferably hydrogen but may be a lower alkyl radical. The term "lower alkyl" includes saturated radicals containing up to about 10 carbon atoms. If $R^6$ is alkyl, it is preferably methyl.

The $R^n$ radicals are divalent ones which do not react with the other portions of the molecule under the conditions described in this application. These divalent radicals are preferably hydrocarbon but may contain substituents such as those enumerated above. Alternatively, they may contain other elements such as nitrogen, phosphrous, silicon and the like. For example, the $R^n$ radicals may be derived from polyamides or polyurethanes.

The bridging radical X is derived from an active hydrogen compound such as $NH_3$, $H_2O$, $RNH_2$, $RPH_2$, $PH_3$, $H_2S$, etc. Preferably, X contains at least one active hydrogen atom which can be abstracted to give a trivalent radical X'. In a preferred embodiment, X is NH and the unit ($R^n-X$) is an alkyleneamino radical.

The radicals $Y^1$, $Y^2$, $Y^3$ and Z are defined as indicated and will vary, for each individual compound, according to both the starting materials used and the method of preparation. The identity of these units also depends to some extent upon chance, as influenced by the reactivity of the various reaction sites in the N-3-oxohydrocarbon-substituted acrylamide used as the starting material. Thus, the combination of these units may define any of several discrete monomeric reaction products, including cyclic products, or they may define a polymeric structure containing a number of such monomeric units connected as more fully exemplified hereinafter.

The value of the numeral $n$ will also vary according to the reactants used. Where the $R^n$ radicals are hydrocarbon, especially alkyl, $n$ is usually from 0 to about 5 at most. If $R^n$ is a polyamide or polyurethane radical, the value of $n$ may be much higher—about 25 to 50, for example.

The compositions of the present invention are representative of a series of products obtainable by the reaction of numerous compounds, notably active hydrogen compounds, with N-3-oxohydrocarbon-substituted acrylamides which involve two of the reactive sites of said acrylamides. These two reactive sites are the olefinic double bond and the ketone carbonyl group. In describing these compounds and the reactions leading thereto, reference will usually be made hereinafter to diacetone acrylamide as the N-3-oxohydrocarbon-substituted acrylamide used; but it is to be understood that other compounds of the series may be substituted for diacetone acrylamide in these reactions. (The preparation of N-3-oxohydrocarbon-substituted acrylamides is described in U.S. Patent 3,277,056.)

Diacetone acrylamide undergoes the usual ketone reactions involving the carbonyl group. These include addition of sodium cyanide and sodium bisulfite, formation of Schiff's bases with amines, and reaction with various carbonyl reagents such as hydroxylamine and the substituted hydrazines. These reactions are illustrated by the following examples.

Example 1

A methanolic solution of 0.5 mole of diacetone acrylamide and 0.5 mole of hydroxylamine is prepared and stirred for 15 minutes, with gentle heating. A crystalline precipitate of diacetone acrylamide oxime is precipitated, removed by filtration and dried.

Example 2

The procedure of Example 1 is repeated, except that the hydroxylamine is replaced by an equimolar amount of semicarbazide hydrochloride. The product is the semicarbazone of diacetone acrylamide.

Example 3

A methanolic solution of 0.5 mole of diacetone acrylamide is prepared, and 0.5 mole of sodium bisulfite is added thereto. The solution is stirred for a few minutes with gentle heating, whereupon a crystalline precipitate of the bisulfite addition product of diacetone acrylamide is formed. It is filtered and dried.

Example 4

A benzene solution of equimolar amounts of diacetone acrylamide and n-butylamine is heated under reflux, the water of reaction being removed by means of a water trap. When no more water is evolved, the benzene solution is evaporated and there is obtained the desired diacetone acrylamide-n-butylamine Schiff's base.

Other reactions may also be carried out; these include, for example. the formation of ketals by reaction with ethylene glycol in an acidic medium. This reaction should be carried out in a non-aqueous system to avoid hydrolysis of the amide linkage.

Diacetone acrylamide also undergoes typical reactions involving addition to activated olefinic bonds. Compounds which may be added include alcohols, amines, mercaptans, urea derivatives, phosphorodithioic acids, phosphinic acids, sodium bisulfite, sodium sulfide and the like. The olefinic bonds may also undergo the so-called "Michael reaction" (addition of active methylene compounds in an alkaline medium). However, because of the presence of a possibly interfering carbonyl group, the preparation of Michael addition compounds may preferably be accomplished by first blocking the carbonyl group, e.g., by the formation of the ethylene ketal, and hydrolyzing the ketal function after the Michael addition product has been formed.

The following examples are illustrative of reactions with the olefinic bond of diacetone acrylamide.

Example 5

To a solution of 0.23 gram of sodium in 16 grams of methanol is added 68 grams (0.4 equivalent) of diacetone acrylamide. The mixture is stirred at room temperature for 90 hours, after which time 0.7 gram of acetic acid is added and the mixture is filtered. The filtrate is distilled and the fraction boiling between 120–150° C. at 4.5 mm. is collected and redistilled. There is obtained 51 grams of the addition product of methanol and diacetone acrylamide, N-(1,1-dimethyl-3-oxobutyl)-3 - methoxypropionamide.

Example 6

To a mixture of 4.0 grams of sodium hydroxide and 4.1 grams (0.025 equivalent) of cotton cellulose in 30 grams of water is added 4.3 grams (0.025 equivalent) of diacetone acrylamide. The mixture is maintained at 50° C. for one week, with occasional stirring, after which time the liquid is decanted and the fibers are thoroughly washed with water, 5% aqueous hydrochloric acid and a second porton of water. Upon drying the fibers, there is obtained an addition product of cellulose and diacetone acrylamide containing 0.1% nitrogen.

Example 7

A solution of 7.6 grams (0.2 equivalent) of thiourea in 15 grams of methanol is prepared, and a solution of 3.7 grams of concentrated hydrochloric acid in 10 grams of methanol is added thereto, followed by a solution of 16.9 grams (0.1 equivalent) of diacetone acrylamide in 10 grams of methanol. The mixture is heated under reflux for 10 minutes, and then 25 grams of methanol is removed by distillation and replaced with 25 grams of acetone. The mixture is stored at 0° C. overnight, and the crystals which form are removed by filtration and recrystallized from a mixture of methanol and acetone. There is obtained 24.5 grams of S-[N-(1,1-dimethyl - 3 - oxobutyl)-β-carboxyamidoethyl]-thiuronium chloride, M.P. 146–149° C. The structure is confirmed by the following elemental analysis: percent nitrogen—14.7 (calc. 14.91); percent sulfur—11.96 (calc. 11.38).

Example 8

Sodium, 0.02 gram, is added to a mixture of 16.9 grams (0.1 equivalent) of diacetone acrylamide and 20.2 grams (0.1 equivalent) of lauryl mercaptan at 75° C. The mixture is heated; a vigorous reaction begins at 100° C. which raises the temperature of the mixture to 130° C. The mixture is maintained above 100° C. for 15 minutes and is then cooled to 50° C. and dissolved in 50 ml. of textile spirits. The organic solution is extracted with two 25-ml. portions of water, and the bulk of the solvent is removed by evaporation. Upon filtration of the remaining material and drying of the solid product at 50° C./20 mm. for five hours, there is obtained 27 grams of N-(1,1-dimethyl-3-oxobutyl)-β-carboxyamido-ethyl n-dodecyl sulfide, M.P. 53–56° C. The structure is confirmed by the following elemental analysis: percent nitrogen—3.69 (calc. 3.7); percent sulfur—8.14 (calc. 8.60).

Example 9

A mixture of 16.9 grams (0.1 equivalent) of diacetone acrylamide and 21.4 grams (0.1 equivalent) of isopropyl phosphorodithioic acid is stirred at room temperature. The temperature of the mixture rises to 70° C. and is maintained at 70–80° C. for 15 minutes, after which time the mixture is cooled to room temperature and dissolved in a mixture of 60 ml. of textile spirits and 30 ml. of benzene. The organic solution is extracted with two 25-ml. portions of 1% aqueous sodium hydroxide and two 25-ml. portions of water. The organic phase is dried over sodium sulfate and the solvent is removed at 100° C./20 mm. There is obtained 26 grams of O,O'-diisopropyl S-[N-(1,1-dimethyl-3-oxobutyl)-β-carboxyamido - ethyl] dithiophosphate. The structure is confirmed by the following elemental analysis: percent nitrogen—3.65 (calc. 3.65); percent phosphorus—8.22 (calc. 8.08).

Example 10

To a mixture of 68 grams (0.4 equivalent) of diacetone acrylamide and 40 grams (0.44 equivalent) of t-butyl mercaptan at 50° C. is added, with stirring, 0.1 gram of sodium. The solution is slowly heated to 70° C., whereupon a vigorous reaction occurs which causes the temperature to rise to 130° C. The mixture is heated at a temperature above 100° C. for 15 minutes, after which the solvent is evaporated at 100° C./20 mm. The residue, which weighs 97 grams, is dissolved in 1000 ml. of textile spirits and extracted with three 150-ml. portions of water. Upon standing, a white crystalline solid deposits from the organic solution and is collected by filtration and recrystallized from textile spirits. The product thus obtained melts at 76–78° C. and is the desired N-(1,1-dimethyl-3-oxyobutyl)-β-carboxyamidoethyl-t-butyl sulfide.

Example 11

To a solution of 0.02 gram of sodium in 0.5 gram of methanol is added a mixture of 33.8 grams (0.2 equivalent) of diacetone acrylamide and 17.0 grams (0.4 equivalent) of piperidine. The reaction mixture is held at 50° C. for one hour, after which time the catalyst is neutralized by the addition of methanolic hydrochloric acid and the reaction mixture is dissolved in 800 grams of water. To the solution, after filtration, is added 50 grams of sodium chloride, and the aqueous layer is then extracted with six 50-gram portions of benzene. The combined benzene extracts are dried over sodium sulfate, filtered and evaporated at 60° C./20 mm. The residue is the desired N-[N'-

(1,1 - dimethyl - 3 - oxobutyl) - β - carboxyamidoethyl]-piperidine.

Example 12

A mixture of 16.9 grams (0.1 equivalent) of diacetone acrylamide, 16.0 grams (0.1 equivalent) of thio-β-naphthol and 0.05 gram of sodium methoxide is heated to 100° C. for two hours. It is then cooled to room temperature, dissolved in a mixture of 60 grams of benzene and 40 grams of textile spirits, and extracted with two 50-ml. portions of water. The organic phase is separated and filtered, and 300 ml. of textile spirits is added to the filtrate. There is obtained a yellow-brown viscous liquid which is the desired N-(1,1,-dimethyl-3-oxobutyl)-β-carboxyamidoethyl-β-naphthyl sulfide. The structure is confirmed by the following elemental analysis: Percent nitrogen—4.14 (calc. 4.25); percent sulfur—9.65 (calc. 9.73).

Example 13

A mixture of 16.9 grams (0.1 equivalent) of diacetone acrylamide, 8.7 grams (0.1 equivalent) of morpholine and 0.05 gram of sodium methoxide is heated at 50° C. for 48 hours. The mixture is dissolved in 100 ml. of benzene and extracted with 10 ml. of water, after which the benzene solution is evaporated at 60° C./20 mm. and the residue is extracted with two 150-ml. portions of textile spirits. Upon evaporation of the extract, there is obtained a light yellow-brown viscous liquid which is the desired N - [N' - (1,1 - dimethyl - 3 - oxobutyl) - β - carboxyamidoethyl]morpholine.

Example 14

To a mixture of 16.9 grams (0.1 equivalent) of diacetone acrylamide and 7.9 grams (0.1 equivalent) of pyridine is added a solution of 3.7 grams (0.1 mole) of concentrated hydrochloric acid in 20 ml. of methanol. The mixture is maintained at 50° C. for 24 hours, and the methanol is then removed under reduced pressure. There is obtained 27 grams of a yellow viscous liquid which is the desired N-[N'-(1,1-dimethyl-3-oxobutyl)-β-carboxyamidoethyl]pyridinium chloride.

The preferred compositions of this invention are prepared by reacting an N-3-oxohydrocarbon-substituted acrylamide of the general formula

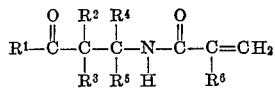

wherein each of $R^1$, $R^2$, $R^3$, $R^4$ and $R^5$ is individually hydrogen or a hydrocarbon radical, and $R^6$ is hydrogen or a lower alkyl radical, with a nitrogen-containing compound of the general formula $H_2N(R^nNH)_{n-1}R°NH_2$, wherein R° and each $R^n$ are divalent hydrocarbon radicals or ($R^n$—NH) and (R°—NH) are divalent polyamide radicals, and $n$ is an integer from 1 to about 100. Especially desired compositions are prepared by reacting diacetone acrylamide, diacetone methacrylamide or diacetophenone acrylamide [N-(1-methyl-1,3-diphenyl-3-oxopropyl)acrylamide], preferably the former, with such amino compounds as:

Polyalkylene polyamines (e.g., ethylene diamine, diethylene triamine, triethylene tetramine, etc.)
Phenylenediamine
Methylenedianiline
Aminoethylpiperazine
Diaminodiphenylsulfone
Dicyandiamide
Versamides (low molecular weight, amine-terminated polyamide)
1-amino-1-methyl-4-(2-amino-2-propyl)-cyclohexane The reaction may be carried out at a temperature of about 25–150° C. The equivalent weight ratio of the acrylamide to the amine compound should be less than 1; the lowest suitable ratio may be expressed by the formula $$\frac{a}{a+1}$$

wherein $a$ is an integer from 0 to about 100. Thus, $a/b$ equivalents of the acrylamide are reacted with at least $$\frac{a+1}{b}$$

equivalents of the polyamine, $b$ also being an integer from 1 to about 100. The terms "equivalents" and "equivalent weight" refer to the molecular weight of the compound divided by the number of reactive sites therein; for this purpose, diacetone acrylamide is considered to have an equivalent weight equal to its molecular weight, while for a polyamine the equivalent weight is the molecular weight divided by the number of amino groups in the molecule. For an amine-terminated polyamide, the equivalent weight is taken as half the molecular weight.

Of particular interest, especially as epoxy curing agents, are the reaction products of one equivalent of diacetone acrylamide with about 3–6 equivalents (1–2 moles) of diethylene triamine.

The reaction between diacetone acrylamide and the amino compound is best effected by merely heating a mixture of the two reactants, preferably at about 45–100° C. Ordinarily, no solvent is necessary for the reaction, but such solvents or diluents as alcohols, ketones, ethers, aromatic or aliphatic hydrocarbons or the like may sometimes be used. For the purposes of this invention, it is ordinarily not necessary to purify the compositions thus obtained, but purification may sometimes be effected by recrystallization, distillation or the like.

The precise molecular structure of the compositions prepared by the above-described method is not known. They are probably complex mixtures of compounds of the Schiff's base type and compounds resulting from addition of the amine across the acrylamide double bond. There is evidence that the Schiff's base is formed rapidly and almost exclusively in the first few minutes, and that addition across the double bond (as evidenced by a viscosity increase) occurs slowly during storage. Thus, the following compounds (wherein R is a divalent hydrocarbon radical) are exemplary of those formed by the reaction of diacetone acrylamide with a dialkylene triamine.

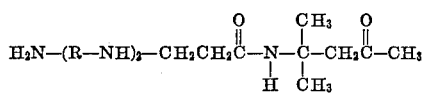

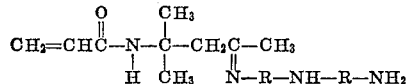

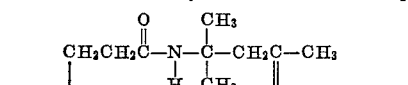

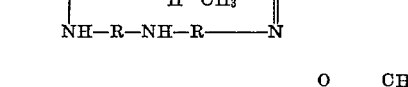

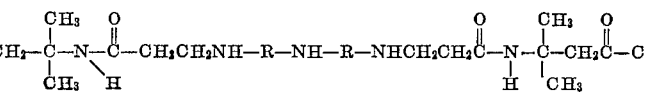

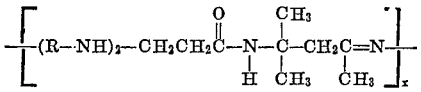

Other compounds, such as those formed by linking two diacetone acrylamide residues by one polyamine moiety through the carbonyl group, or through the carbonyl group of one such residue and the olefinic bond of the other, are also possible. Moreover, if the acrylamide-amino linkage is through the olefinic bond it need not necessarily be by connection with the terminal amino group on the chain; for example, where the amine is a polyethylene polyamine it may be attached through any one of the amino radicals (although there is evidence that the primary amine groups are principally involved).

Compounds similar to those exemplified above, except that each of the R—NH radicals is replaced by one or more

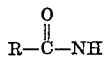

radicals, are formed when the polyamine is replaced by an amine-terminated polyamide in the reaction.

The preparation of nitrogen-containing compositions of the present invention is illustrated by the following examples.

Example 15

Diacetone acrylamide, 169 grams (1.0 equivalent), is heated to 66° C. under nitrogen, with stirring, and 51.5 grams (1.5 equivalents) of diethylene triamine is added dropwise. The reaction mixture is heated at 77° C. for one hour and cooled. There is obtained a reaction product of the polyamine with diacetone acrylamide.

Example 16

The procedure of Example 15 is repeated, except that 103 grams (3.0 equivalents) of diethylene triamine is used.

Example 17

The procedure of Example 15 is repeated, except that 84.5 grams (0.5 equivalents) of diacetone acrylamide and 103.17 grams (3 equivalents) of diethylene triamine are used.

Example 18

To a solution of 154 grams (0.91 mole) of diacetone acrylamide in 307 grams of xylene is added 500 grams (1.82 equivalents) of Versamid 125, an amine-terminated liquid polyamide of low molecular weight. The mixture is heated at 72° C. for one hour under nitrogen, with stirring, and is then cooled to room temperature. The product is a 1:2 condensate of the polyamide with diacetone acrylamide. This product is blended with 30 grams of butanol.

Example 19

The procedure of Example 18 is repeated except that 77.25 grams (0.46 equivalent) of diacetone acrylamide, 310.5 grams of xylene and 30.85 grams of butanol are used.

Example 20

The procedure of Example 15 is repeated, except that the diethylene triamine is replaced by 2.0 equivalents of ethylene diamine.

Example 21

The procedure of Example 15 is repeated, using 1.0 equivalent of diacetone methacrylamide and 3.0 equivalents of diethylene triamine.

Example 22

The procedure of Example 15 is repeated, except that equivalent of diacetophenone acrylamide and 3.0 equivalents of diethylene triamine.

Example 23

The procedure of Example 15 is repeated, using 3.0 equivalents of diacetone acrylamide and 5.0 equivalents of tetraethylene pentamine.

Example 24

The procedure of Example 15 is repeated, except that the diethylene triamine is replaced by 1.5 equivalents of phenylenediamine.

Example 25

The procedure of Example 15 is repeated, except that the diethylene triamine is replaced by 1.5 equivalents of aminoethylpiperazine.

Example 26

The procedure of Example 15 is repeated, except that the diethylene triamine is replaced by 1.5 equivalents of diaminodiphenylsulfone.

Example 27

The procedure of Example 15 is repeated, except that the diethylene triamine is replaced by 1.5 equivalents of dicyandiamide.

The compositions of this invention, especially those containing amine or mercaptan groups, serve as excellent curing agents for epoxy resins. In particular, these compositions give to the resins cured therewith increased stability to light and ultraviolet rays. They also improve resistance of epoxy paints to chalking, crazing and the like.

One of the advantages of the compositions of this invention is their low toxicity and decreased tendency to irritate skin and eyes, as compared with polyamines and polyamides normally used for curing epoxy resins. Because of these properties, said compositions are harmless to handle and much more convenient to use than more toxic or irritating curing agents. The following table contains toxicity and irritation data, and the classification of the results thereof according to the Federal Hazardous Substances Labeling Act. The figure given as "Toxicity $LD_{50}$" is the relative weight of the composition, in grams per kilogram of body weight, required to kill 50% of the test animals. The skin and eye irritation figures are roughly proportional to the degree of irritation; that is, the higher the figure the greater the irritation.

| Composition | Toxicity, $LD_{50}$ | Skin Irritation | Eye irritation | | |
|---|---|---|---|---|---|
| | | | 24 hr. | 48 hr. | 72 hr. |
| Product of Example 15 | 5–10, Non-toxic | 0, Non-irritating | 2.0 | 1.7 Non-irritating | |
| Product of Example 16 | 5–10, Non-toxic | 0, Non-irritating | 2.0 | 1.3 Non-irritating | 1.3 |
| Product of Example 17 | 2–5, Toxic | 0, Non-irritating | 5.7 | 1.7 Non-irritating | 0 |
| Diethylene triamine | 1–2, Toxic | 8.0, Corrosive | Not graded; eyes severely damaged | | |
| Versamid 125 | >20, Non-toxic | 0.08, Non-irritating | 32.0 | 23.7 Irritating | 15.7 |
| Diacetone acrylamide | 2–5, Toxic | 0, Non-irritating | 0 | 0 Non-irritating | 0 |

It will be seen from this table that the compositions of this invention are uniformly low in toxicity and irritant properties, despite the fact that both the amine and the diacetone acrylamide used in their preparation are more toxic or more irritating.

The reaction sequence by which curing of epoxy resins is effected varies according to whether the curing agent contains primary, secondary, or tertiary amine groups. When the amine groups are primary, it is believed that the amine itself is incorporated into the molecule through a crosslinking reaction by which two terminal epoxy groups react with the amine as follows.

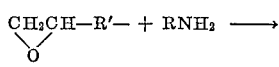

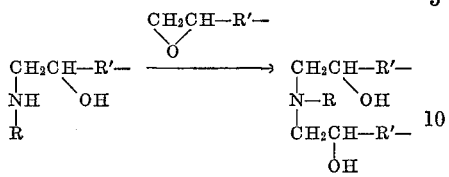

The same type of reaction may be entered into when the curing agent contains two amine groups, either or both of which are secondary; a crosslinking species may then comprise the two amine groups with the linking radical rather than a single amine group.

When the curing agent is a tertiary amine, the mechanism of the crosslinking reaction is believed to involve salt formation with an epoxy group, which then in turn reacts with a second epoxy group to form a direct oxygen bridge between the two. Reaction may then proceed to form a gridlike structure, as indicated in the following reaction scheme.

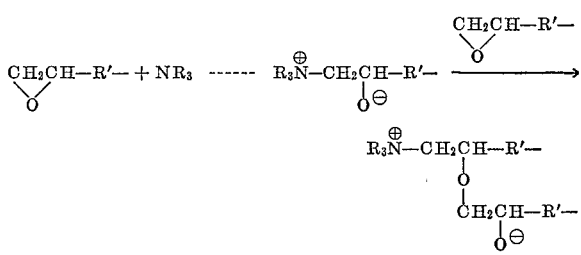

While most primary and secondary amines function as curing agents at room temperature, heat may be required in certain instances, especially with tertiary amines and with other curing agents such as dicyandiamide and its derivatives, to initiate the curing process. From a physical standpoint, the result is substantially the same—formation of an infusible, crosslinked resin—regardless of which kind of curing agent is used.

The stability to light and ultraviolet rays which is exhibited by epoxy resins cured with the nitrogen-containing compositions of this invention is believed to be imparted by the N-3-oxohydrocarbon group. Polymers of N-3-oxohydrocarbon-substituted acrylamides, especially diacetone acrylamide, are known to be very stable under similar conditions.

The amounts of the compositions of this invention to be used in the resin as curing agents are usually calculated most conveniently in terms of the amount of amine or polyamide chemically equivalent thereto. About 3–40 parts of amine or polyamide per 100 parts of resin is usually sufficient; the amine can often be present in lesser amounts than the polyamide (preferably 3–10 phr. for the amine and about 25–40 phr. for the polyamide). About 10–50 phr. of the composition of this invention will provide the desired results in most instances.

The improvement in properties of epoxy resins cured with the compositions of this invention is shown by the following series of tests in which aluminum panels are coated with epoxy paint compositions and then subjected to severe light and weather conditions. The two paint compositions used in this test are constituted as follows:

Paint A:                                  Parts by weight
    Titanium dioxide _____ 500
    Bisphenol A-epichlorohydrin epoxy resin _____ 500
    Methyl isobutyl ketone _____ 167
    Xylene _____ 167
    Ethylene glycol monoethyl ether _____ 166

Paint B:
    Titanium dioxide _____ 809
    Bisphenol A-epichlorohydrin epoxy resin _____ 900
    Methyl isobutyl ketone _____ 450
    Xylene _____ 450

In the first series of tests, 100 parts by weight of Paint A is combined with a quantity of diacetone acrylamide-diethylene triamine reaction product sufficient to provide 6 parts of the amine constituent thereof per 100 parts of epoxy resin. The resulting paint composition is then applied by draw-coating to the aluminum panels to give a paint coating 1–1.5 mils thick. The panels are allowed to dry at room temperature and are then subjected to the following conditions.

(1) *"Fade-O-Meter" Test.*—The panels are suspended on a rotating frame in a cabinet and subjected to intense ultraviolet radiation for the test period. After 500 hours and 1200 hours, the panels are evaluated for gloss by means of a Gardner Gloss Meter and for yellowing by means of a reflectometer.

(2) *Outdoor Exposure Test.*—The panels are exposed at a 45° angle, facing south, for the test period. They are then evaluated for gloss as described above.

The panels thus treated are compared with a control in which the diacetone acrylamide-diethylene triamine reaction product is replaced by diethylene triamine, also at 6 parts by weight per 100 parts of epoxy resin.

In the second series of tests, the diacetone acrylamide-polyamide reaction products are added to Paint B in an amount sufficient to provide about 33 parts of the polyamide (either reacted or unreacted) per 100 parts of resin. Aluminum panels are spray-coated with the epoxy paint and allowed to dry, and then are evaluated by the methods described hereinabove. Comparison is made with two controls, one containing a xylene-n-butanol blend of the polyamide alone and the other containing a similar blend of physical mixture of the polyamide and diacetone acrylamide in the amounts used in Example 18.

The results of these tests are given in Table I. (In the "Gloss" column, the amount of gloss increases with higher readings; under "Yellowing," higher readings indicate a greater degree of yellowing.)

The results of these tests show that the compositions of this invention are superior to unreacted amines and polyamides as curing agents for epoxy paints, in that they decrease discoloration of paints prepared from such resins and also decrease the amount of chalking, cracking and crazing which painted surfaces undergo after prolonged exposure to severe light and atmospheric conditions.

Epoxy resins cured with the composition of this invention may also be used as additives, in molding applications and for impregnating glass fiber mats and the like. For the latter purpose, the mat is generally impregnated with uncured resin and then the curing agent is added. The products have excellent hardness, impact resistance and tensile strength in addition to the improved properties described above.

It is believed that the advantages of the curing agents of this invention derive from a reaction that takes place when the curing agent reacts with the resin. Apparently, the curing agent is hydrolyzed by small quantities of water present in the reaction mass and dissociates into the amine or polyamide and diacetone acrylamide. The former is the active curing ingredient, and the latter serves as a light stabilizer and may also add strength to the resin through homopolymerization or crosslinking. However, the invention is not limited by this or any other theory or proposed reaction mechanism.

The amine compositions of this invention are also useful as salt formers with organic acids. Thus, they may be used in the purification of physiologically active compounds such as penicillanic acid.

TABLE I

| Curing agent, identity | | Amount, phr. | Test hours | Gloss Fade-O-Meter | Gloss Outdoor exposure | Yellowing | Remarks |
|---|---|---|---|---|---|---|---|
| Paint formulation: | | | | | | | |
| A | Diethylene triamine | 6.0 | 0 | 60-65 | 60-65 | | Severe chalking. |
| | | | 500 | 18-23 | 18-21 | .0458 | |
| | | | 1,200 | 8-10 | | .279 | |
| A | Product of Example 15 | 25.7 | 0 | 92-94 | 92-94 | | No chalking. |
| | | | 500 | 82-85 | 94-96 | .0234 | |
| | | | 1,200 | 38-40 | | .227 | |
| A | Product of Example 16 | 15.8 | 0 | 90-92 | 90-92 | | Do. |
| | | | 500 | 80-83 | 87-92 | .0346 | |
| | | | 1,200 | 45-50 | | .252 | |
| A | Product of Example 17 | 10.9 | 0 | 89-92 | 89-92 | | Do. |
| | | | 500 | 80-82 | 87-92 | .0575 | |
| | | | 1,200 | 20-22 | | | |
| B | Polyamide | 30.0 | 0 | 99-100 | 99-100 | | Cracking and crazing. |
| | | | 500 | 82-83 | 92-93 | .0802 | |
| | | | 1,200 | 19-22 | | .352 | |
| B | Polyamide plus diacetone acrylamide | 43.2 | 0 | 100 | 100 | | Do. |
| | | | 500 | 83-85 | 91-93 | .0495 | |
| | | | 1,200 | 35-37 | | .302 | |
| B | Product of Example 18 | 43.2 | 0 | 100 | 100 | | No crazing. |
| | | | 500 | 94-98 | 97-100 | .0242 | |
| | | | 1,200 | 42-45 | | .275 | |
| B | Product of Example 19 | 34.6 | 0 | 100 | 100 | | Do. |
| | | | 500 | 94-98 | 100 | .0376 | |
| | | | 1,200 | 33-35 | | .275 | |

What is claimed is:

1. An infusible composition of matter formed by reacting (1) a linear epoxy-terminated polymer with (2) a composition characterized by the presence therein of at least one of the compounds

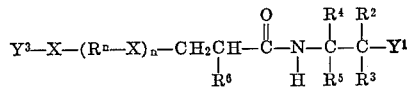

and

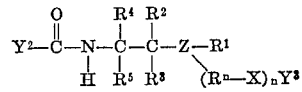

wherein:
each of $R^1$, $R^2$, $R^3$, $R^4$ and $R^5$ is hydrogen or a hydrocarbon radical;
$R^6$ is hydrogen or a lower alkyl radical;
each $R^n$ is a hydrocarbon radical, or $(R^n—X)_n$ is a polyamide radical;
X is selected from the group consisting of NH, O, NR, PR, PH and S wherein R is a hydrocarbon radical;

$Y^1$ is

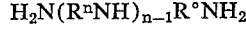

$Y^2$ is $-\underset{R^6}{\underset{|}{C}}=CH_2$ or $-\underset{R^6}{\underset{|}{C}}HCH_2(X-R^n)_nX-Y^3$ $Y^3$ is hydrogen or a valence bond forming with $Y^1$ or $Y^2$ a cyclic compound or polymeric structure wherein the compounds characterizing said composition are repeating units thereof;

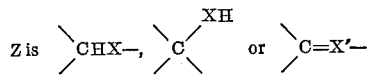

$X'$ is a trivalent radical formed by abstracting a hydrogen atom from X; and
$n$ is an integer from 0 to about 100.

2. An infusible composition according to claim 1 wherein X is NH, Z is >C=N—, and each $(R^n—X)$ is an alkyleneamino or polyamide radical.

3. An infusible composition according to claim 2 wherein $R^1$, $R^4$ and $R^5$ are methyl and $R^2$, $R^3$ and $R^6$ are hydrogen.

4. An infusible composition according to claim 3 wherein each $R^n$ is an alkylene radical.

5. An infusible composition according to claim 3 wherein each $(R^n—X)$ is a divalent polyamide radical.

6. An infusible composition of matter formed by the reaction of (1) a linear epoxy-terminated polymer with (2) the product prepared by reacting, at a temperature of about 25–150° C.:

(A) $a/b$ equivalents of an N - 3 - oxohydrocarbon-substituted acrylamide of the general formula

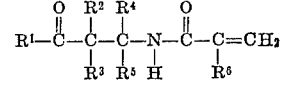

wherein each of $R^1$, $R^2$, $R^3$, $R^4$ and $R^5$ is individually hydrogen or hydrocarbon radical; $R^6$ is hydrogen or a lower alkyl radical; and $a$ and $b$ are integers from 1 to about 100; with (B) at least about $$\frac{a+1}{b}$$

equivalents of a nitrogen-containing compounds of the general formula $$H_2N(R^nNH)_{n-1}R°NH_2$$

wherein R° and each $R^n$ are divalent hydrocarbon radicals or $(R^n—NH)$ and $(R°—NH)$ are divalent polyamide radicals, and $n$ is an integer from 1 to about 100.

7. An infusible composition according to claim 6 wherein component A is N-(1,1-dimethyl-3-oxobutyl) acrylamide.

8. An infusible composition according to claim 7 wherein component B is a polyalkylene polyamine.

9. An infusible composition according to claim 8 wherein component B is diethylene triamine.

10. An infusible composition according to claim 9 wherein the equivalent weight ratio of A to B is between about 1:3 and 1:6.

References Cited

UNITED STATES PATENTS 3,277,056  10/1956  Coleman _____ 260—80.73

MURRAY TILLMAN, *Primary Examiner.*

P. LIEBERMAN, *Assistant Examiner.*

U.S. Cl. X.R.

260—2, 32.8, 33.2, 33.6, 37, 47, 63, 65, 836, 837